United States Patent [19]

Colotti et al.

[11] Patent Number: 4,796,030

[45] Date of Patent: Jan. 3, 1989

[54] DUAL THRESHOLD AMPLITUDE DETECTOR

[75] Inventors: James J. Colotti, Wantagh; Tullio N. G. DeFilippis, Garden City, both of N.Y.

[73] Assignee: Eaton Corporation, Cleveland, Ohio

[21] Appl. No.: 17,154

[22] Filed: Feb. 20, 1987

[51] Int. Cl.[4] .............................................. G01S 13/74
[52] U.S. Cl. ...................................... 342/40; 307/360
[58] Field of Search ................ 307/360, 247.1; 342/40

[56] References Cited

U.S. PATENT DOCUMENTS

| | | | |
|---|---|---|---|
| 3,305,860 | 2/1967 | Humphreys | 342/40 X |
| 4,070,673 | 1/1978 | Schmidt et al. | 342/40 X |
| 4,135,161 | 1/1979 | Torrieri | 307/360 X |
| 4,139,851 | 2/1979 | Risko | 307/360 X |
| 4,184,087 | 1/1980 | Nutz | 307/360 |
| 4,217,506 | 8/1980 | Sawyer, Jr. et al. | 307/360 |
| 4,524,291 | 6/1985 | Lehning | 307/360 X |
| 4,613,770 | 9/1986 | Raab | 307/360 X |
| 4,618,770 | 10/1986 | Maile | 307/360 X |

Primary Examiner—Thomas H. Tarcza
Assistant Examiner—John B. Sotomayor
Attorney, Agent, or Firm—Andrus, Sceales, Starke & Sawall

[57] ABSTRACT

An amplitude detector is disclosed passing only video input signals whose voltage amplitudes are within specified minimum and maximum limits, and is particularly useful in a secondary radar system for filtering out FRUIT, friendly replies to unintentionally interogated targets. A pair of comparators (4 and 31) compare the video input signal (2) against respective first and second threshold voltages ($V_{th1}$) and $V_{th2}$). The outputs (30 and 33) of the comparators (4 and 31) and AND'ed (34) with each other and with a digitized video signal (32) to actuate a one-shot pulse generator (12) for gating (36) a delayed digital video signal (40) through an output AND gate (22) to yield a video output signal (42).

4 Claims, 3 Drawing Sheets

DUAL THRESHOLD AMPLITUDE DETECTOR

BACKGROUND AND SUMMARY

The invention arose during development efforts relating to amplitude detectors for secondary radar systems for filtering out replies responding to other systems, i.e. FRUIT, friendly replies to unintentionally interrogated targets, though the invention is not limited thereto.

It is known in the prior art to filter out some of the FRUIT by establishing a minimum threshold voltage that the reply video signal must exceed in order to be accepted. The problem with this system is that there is no upper limit.

The present invention provides a system which establishes both minimum and maximum limits that the reply video signal must be between in order to be accepted.

DETAILED DESCRIPTION

Description of Prior Art

Figure 1:
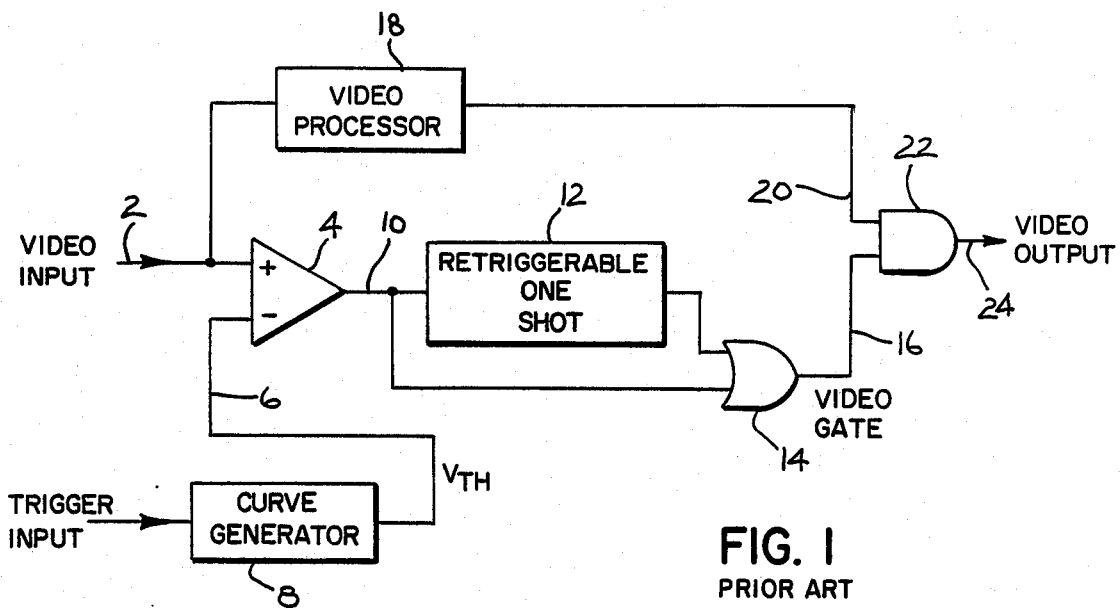
FIG. 1 is circuit diagram of a secondary radar system peak detector known in the prior art.
Figure 2:
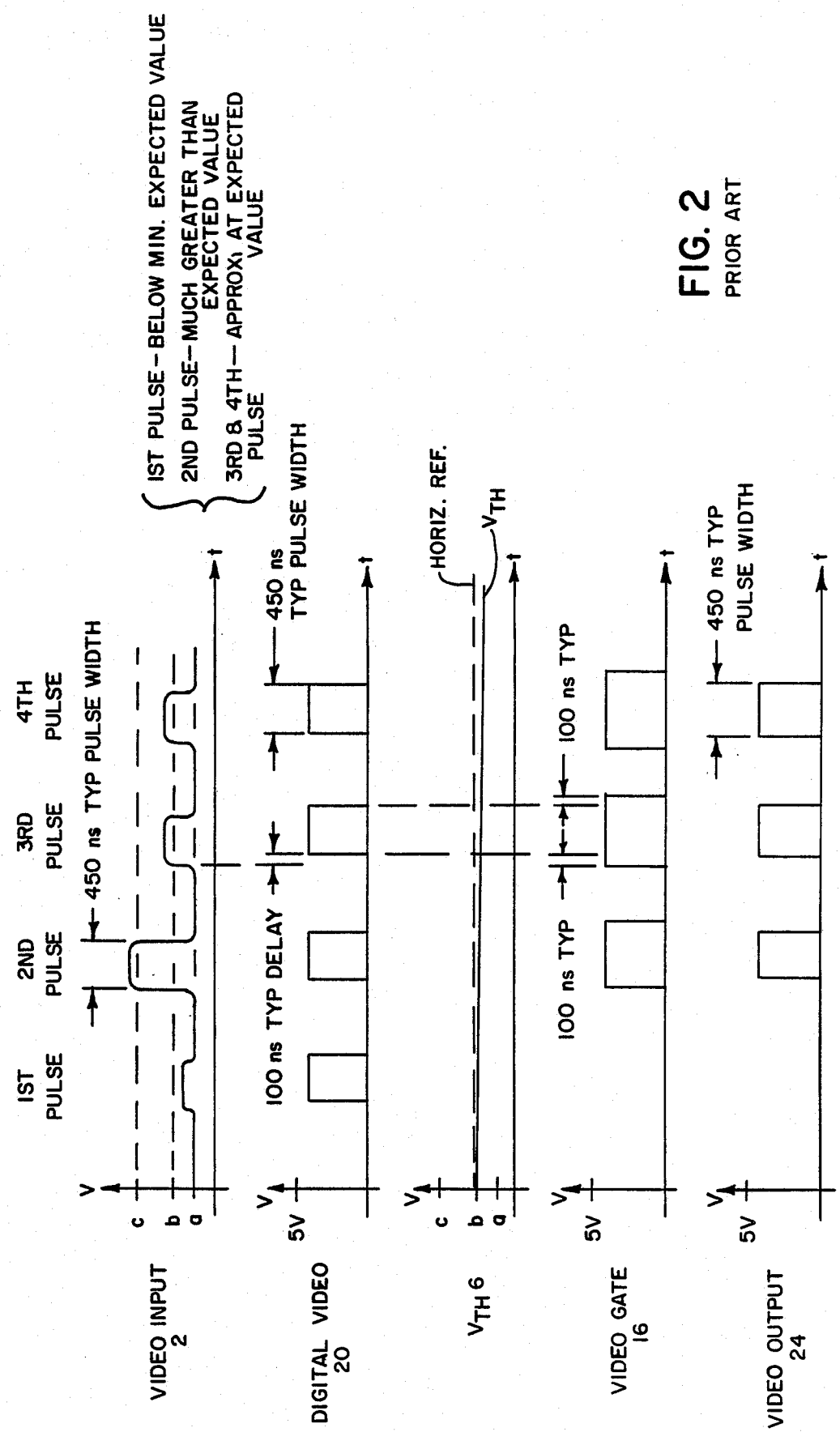
FIG. 2 is a timing diagram illustrating operation of the circuit of FIG. 1.

FIG. 1 shows an amplitude detector circuit for passing only the log video input signal coming from the transponder of a secondary radar system whose voltage amplitude is greater than a level slightly below the given limit, i.e. is greater than a level slightly below the expected amplitude. This helps to filter out FRUIT. The video input signal on line 2 is shown in the first timing line in FIG. 2, showing a series of first, second, third and fourth pulses, with a typical pulse width of 450 nanoseconds. The amplitude of the first pulse is above level "a" but below the minimum expected value at level "b". The amplitude of the second pulse is much greater than the highest expected value "b" and is in fact higher than the highest expected level "c". The third and fourth pulses have amplitudes at approximately the expected value, namely greater than "b" and less than "c". The circuit in FIG. 1 will pass the second, third and fourth pulses.

Comparator 4 in FIG. 1 compares the video input signal on line 2 against a given threshold voltage $V_{th}$ on line 6 provided by curve generator 8 as a function of time when triggered by its trigger input responsive to the video input signal on line 2. As shown in the third timing line in FIG. 2, the threshold voltage on line 6 is initially at level "b" and decays with time, as shown by the downward slope of the solid line, representing $V_{th}$, relative to the dashed horizontal reference line. When the video input signal voltage on line 2 rises above the threshold voltage on line 6, or above a given value relative thereto, comparator 4 generates an output signal on line 10 which triggers retriggerable one-shot element 12, for example an edge transition sensitive Schmitt trigger which responds to the leading edge of the pulse on line 10 to generate a pulse of given width, which pulse is Or'ed at Or gate 14 with the signal on line 10 to produce the video gate signal on line 16 as shown in the fourth timing line in FIG. 2. Video processor 18 quantizes the video input signal on line 2 to a digital video signal on line 20, as shown in the second timing line in FIG. 2, which digital video signal has a typical 450 nanosecond pulse width and a typical 100 nanosecond delay from the leading edge of the pulse on line 2. The digital video signal on line 20 is AND'ed with the video gate signal on line 16 at output AND gate 22 to yield a video output signal on line 24, as shown in the last timing line in FIG. 2. One-shot element 12 maintains a given pulse width to ensure gating of digital video signal 20 even if the output of comparator 4 has stabilized. OR gate 14 provides minimum initial delay of video gating signal 16. The circuit passes the second, third and fourth pulses, as shown in the last timing line in FIG. 2.

DESCRIPTION OF THE INVENTION

Figure 3:
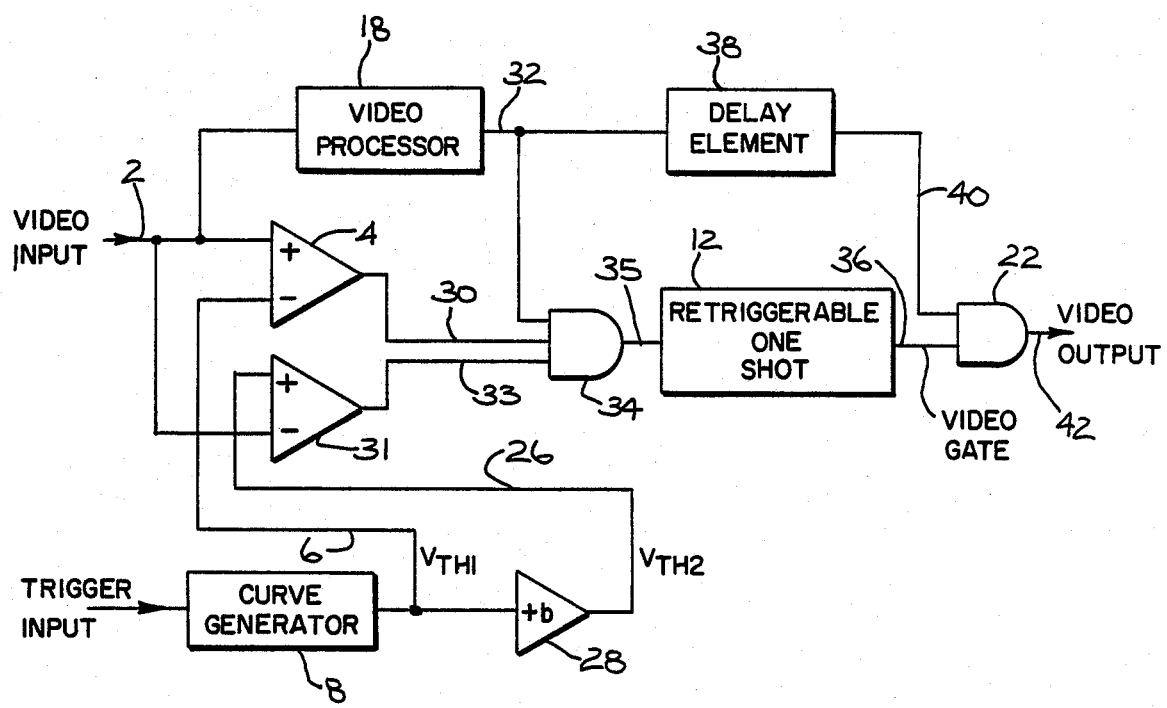
FIG. 3 is a circuit diagram showing a secondary radar system amplitude detector in accordance with the invention.
Figure 4:
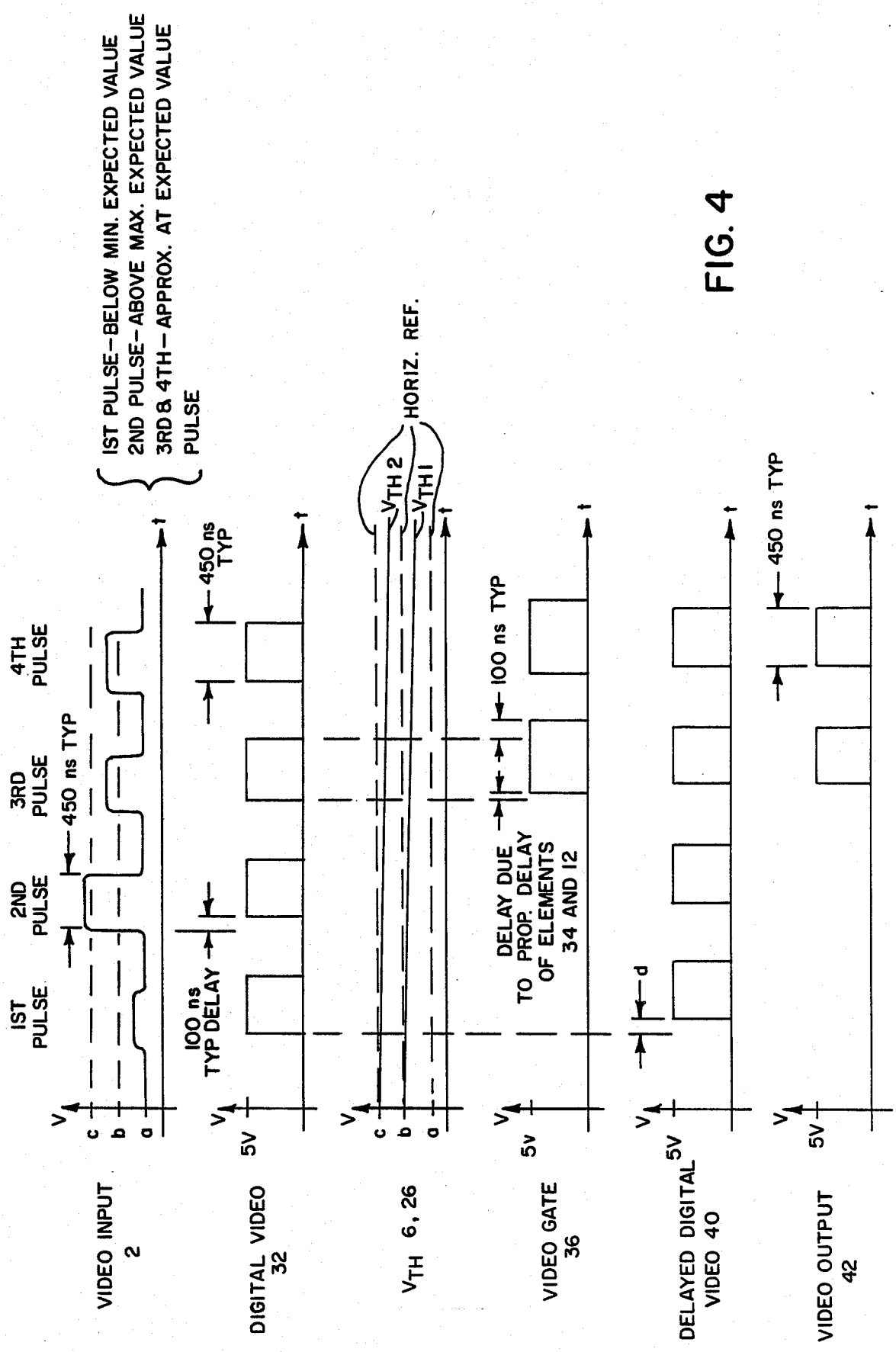
FIG. 4 is a timing diagram illustrating operation of the circuit of FIG. 3.

FIG. 3 shows a dual threshold amplitude detector circuit for a secondary radar system for filtering out FRUIT by passing only video input signals whose voltage amplitudes are within specified minimum and maximum limits. The first timing line in FIG. 4 is identical to that in FIG. 2. The circuit in FIG. 3 passes only the third and fourth pulses.

Curve generator 8 in FIG. 3 provides a first threshold voltgge, $V_{th1}$, on line 6 as in FIG. 1. There is additionally provided a second voltage threshold, $V_{th2}$, on line 26 by means of voltage offset element 28, such as an amplifier. In the preferred embodiment, $V_{th1}$ is initially set at level "b" as in FIG. 1, and an additional "+b" offset is selected to raise $V_{th2}$ up to level "c", as shown in the third timing line in FIG. 4. $V_{th1}$ and $V_{th2}$ decay with time, as shown by the downward slope of the respective solid lines, relative to the respective dashed horizontal reference lines. Alternatively, the curve generator means may include a second curve generator to generate $V_{th2}$ when it is desired that $V_{th1}$ and $V_{th2}$ be independent of each other.

First comparator 4 compares the video input signal on line 2 against the first threshold voltage on line 6 and generates an output signal on line 30 when the input video signal voltage is greater than the first threshold voltage $V_{th1}$, or greater than a given value relative thereto. A second comparator 31 compares the video input signal on line 2 against the second threshold voltage on line 26 and generates an output signal on line 33 when the input video signal voltage is less than the second threshold voltage $V_{th2}$, or less than a given value relative thereto. Video processor 18 quantizes the video input signal on line 2 to a digital video signal on line 32, as in FIG. 1, and as shown in the second timing line in FIG. 4.

First AND gate 34 AND's the output signal on line 30 from first comparator 4 and the output signal on line 33 from second comparator 31 and the digital video signal on line 32 from video processor 18, and generates an output signal on line 35 when each of the three last mentioned signals are in a given state. For example, when the video input signal on line 2 has an amplitude between levels "b" and "c", as shown in the third and fourth pulses in FIG. 4, the output of comparator 4 on line 30 will be high because the video input signal voltage is greater than $V_{th1}$, and the output of comparator 31 on line 33 will be high because the video input signal voltage will be less than $V_{th2}$. Lines 30 and 33 will thus be high, and line 32 is also high, and hence the output of AND gate 34 on line 35 goes high.

Retriggerable one-shot element 12 receives the high output signal on line 35 from AND gate 34 and is triggered by the leading edge thereof to generate an output signal of given pulse width on line 36, as shown in the fourth timing line in FIG. 4, with a delay due to the propagation delay of elements 34 and 12. Delay element 38, for example a counter or the like, delays the digital video signal on line 32 and outputs a delayed digital video signal on line 40, as shown in the fifth timing line in FIG. 4. The amount of delay "d" is selected to compensate for the propagation delay through elements 34 and 12, and is preferably greater than the sum of such propagation delays but less than 100 nanoseconds.

Output AND gate 22 ANDs the delayed digital video signal on line 40 and the output of one-shot element 12 on video gate line 36 and generates the video output signal on line 42, as shown in the last timing line in FIG. 4. As shown in the first and the last timing lines in FIG. 4, the circuit in FIG. 3 does not pass signals below the minimum limit "b" or above the maximum limit "c", for example, the first and second pulses, respectively. The circuit passes only those pulses within such minimum and maximum limits, for example, the third and fourth pulses.

The invention reduces FRUIT beyond prior techniques, and yields higher target capacities, higher detection probabilities and lower false alarm rates than prior secondary radar systems.

It is recognized that various equivalents, alternatives and modifications are possible within the scope of the appended claims.

We claim:

1. In an amplitude detector passing video input signals whose voltage amplitudes are greater than a given limit, comprising comparator means comparing said video input signal against a given threshold voltage, video poocessor means quantizing said video input signal to a digital video signal, and output AND gate means AND'ing said digital video signal and the output of said comparator means to yield a video output signal, the improvement comprising:
    second comparator means comparing said video input signal against a second threshold voltage higher than said first mentioned theshold voltage; and
    intermediate AND gate means comprising three inputs AND'ing said digital video signal and the output of said first mentioned comparator means and the output of said second comparator means, and outputting the result to said output AND gate for AND'ing with said digital video signal.

2. The invention according to claim 1 wherein said first comparator means generates an output signal when the input video signal voltage is greater than a given value relative to said first threshold voltage, said second comparator means generates an output signal when the input video signal voltage is less than a given value relative to said second threshold voltage, such that said intermediate AND gate means passes said digital video signal when the input video signal voltage is between said given values relative to said first and second threshold voltages.

3. The invention according to claim 2 wherein the output of said intermediate AND gate means is provided through retriggerable one-shot means to said output AND gate means, and said digital video signal is provided through delay means to said output AND gate means.

4. An amplitude detector passing only video input signals whose voltage amplitudes are within a dynamic window having dynamic minimum and maximum limits, comprising:
    curve generator means providing first and second threshold voltages as a function of time, said first and second threshold voltages varying with time and providing said dynamic minimum and maximum limits to provide said dynamic window;
    first comparator means comparing said video input signal against said first threshold voltage and generating an output signal when the input video signal voltage is greater than a given value relative to said first threshold voltage;
    second comparator means comparing said video input signal against said second threshold voltage and generating an output signal when the input video signal voltage is less than a given value relative to said second threshold voltage;
    video processor means quantizing said video input signals to a digital video signal;
    first AND gate means AND'ing said output signal from said first comparator means and said output signal from said second comparator means and said digital video signal and generating an output signal when said three last mentioned signals are in a given state;
    retriggerable one-shot means receiving said output signal from said first AND gate means and generating an output signal;
    delay means receiving said digital video signal and outputting a delayed said digital video signal; and
    second AND gate means AND'ing said delayed digital video signal and said output of said one-shot means and generating a video output signal.

* * * * *